United States Patent
Dolby et al.

(10) Patent No.: US 8,769,536 B2
(45) Date of Patent: *Jul. 1, 2014

(54) PROCESSING A BATCHED UNIT OF WORK

(75) Inventors: Trevor Dolby, Southampton (GB); Jose E. Garza, Surrey (GB); Matthew E. Golby-Kirk, Eastleigh (GB); Stephen J. Hobson, Middlesex (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,096

(22) Filed: Mar. 9, 2012

(65) Prior Publication Data

US 2012/0174109 A1 Jul. 5, 2012

Related U.S. Application Data

(63) Continuation of application No. 13/171,576, filed on Jun. 29, 2011.

(30) Foreign Application Priority Data

Jul. 2, 2010 (EP) .................................. 10168325

(51) Int. Cl.
*G06F 9/46* (2006.01)

(52) U.S. Cl.
USPC ........................................... 718/100; 718/101

(58) Field of Classification Search
None
See application file for complete search history.

(56) References Cited

U.S. PATENT DOCUMENTS 5,465,328 A * 11/1995 Dievendorff et al. ........... 714/15

2004/0002988 A1 1/2004 Seshadri et al.
2007/0156656 A1 7/2007 Pather et al.

FOREIGN PATENT DOCUMENTS

EP 0618534 A2 10/1994

OTHER PUBLICATIONS

Bernstein, P. A., et al., "Implementing Recoverable Requests Using Queues," SIGMOD Record, ACM, vol. 19, No. 2, June 1, 1990, ACM, New York, NY, pp. 112-122.
International Searching Authority, International Search Report and Written Opinion for International Patent Application No. PCT/EP2011/060824, Nov. 2, 2011, pp. 1-11.
U.S. Appl. No. 13/171,576—Non-Final Office Action Mailed Mar. 1, 2013.
IBM, "Autonomic Batch Message Processing", ip.com, Inc., IPCOM000133516D, Jan. 27, 2006, pp. 1-5.

* cited by examiner

*Primary Examiner* — Emerson Puente
*Assistant Examiner* — Dong Kim
(74) *Attorney, Agent, or Firm* — A. Bruce Clay

(57) ABSTRACT

A batched unit of work is associated with a plurality of messages for use with a data store. A backout count, associated with a number of instances that work in association with the batched unit of work, is backed out. A backout threshold is associated with the backout count. A commit count is associated with committing the batched unit of work in response to successful commits for a predefined number of the plurality of messages. A checker checks whether the backout count is greater than zero and less than the backout threshold. An override component, responsive to the backout count being greater than zero and less than the backout threshold, overrides the commit count and commits the batched unit of work for a subset of the plurality of messages.

1 Claim, 2 Drawing Sheets

PROCESSING A BATCHED UNIT OF WORK

The current application is related to co-owned and co-pending EP application 10168325.8 filed on Jul. 2, 2010 and titled "An Apparatus for Processing a Batched Unit of Work," which is hereby incorporated by reference.

The present application is also a continuation of U.S. patent application Ser. No. 13/171,576, filed on Jun. 29, 2011, and titled "Processing a Batched Unit of Work," which is incorporated herein by reference.

BACKGROUND

The present invention relates, in general, to processing a batched unit of work, and, in particular, to processing a batched unit of work associated with a plurality of messages for use with a data store.

In message-driven transactional applications, a server performs a disk force for a message transaction when a commit decision has been computed. Disk forces are expensive and cause delay. With message-driven transactions, it is possible to improve efficiency, by batching, such that a single transaction is associated with a predefined number of messages. As such, instead of performing a disk force for a commit decision for each message, a disk force is performed for a number of commit decisions associated with the predefined number of messages. However, batching causes problems e.g., if there is an error that causes one message to fail, work associated with all messages in the (batched) transaction will be backed out.

With reference to FIG. 1, there is shown a system 100 comprising an environment 120 having underlying messaging support comprising a queue manager 130, an input queue 135, an output queue 140, a failure queue 145, and a computer program, e.g., a database manager 125 with database tables 127, of a data processing system.

The system 100 also comprises a message broker 105 hosting an execution group 110 that in turn hosts a message flow 115. A message flow is a visual representation of the sequence of operations performed by the processing logic of a message broker as a directed graph (a message flow diagram) between an input and a target (for example, an input queue and a target queue). The message flow diagram comprises message processing nodes, which are representations of processing components, and message flow connectors between the nodes.

In the example herein, the message flow 115 represents the processing logic of the input queue 135, the output queue 140, the failure queue 145, and the database manager 125.

In a first example, typically, the processing logic gets a message from the input queue 135 (this starts a transaction), updates a database table 127, and puts a message to the output queue 140. This work is normally executed in the transaction, and the work is committed before the next message is obtained from the input queue 135. If there is an error, the work is backed out and the message is "put back" on the input queue 135, in this case, a Backout Count is incremented by 1.

Typically, there is also defined a Backout Threshold for queues which represents the number of times a message is allowed to be backed out before it is put to the failure queue 145. In other words, e.g., if the Backout Count is greater than the Backout Threshold, the message is put to the failure queue 145.

The problem with this example is performance. Committing work causes an associated transaction coordinator and resource owners, in this example, the resource owners are the queue manager 130 and the database manager 125, to force writes to a log which causes delay.

A solution to the above example is provided by a second example. It is possible to improve efficiency, by batching, such that a single transaction is associated with a predefined number of messages. In this way, instead of committing work for each message, the transaction is committed after commits for a predefined number of messages. In one implementation, a message flow attribute termed Commit Count is used, in which, prior to processing, a Message Count is initially set at zero.

Next, the processing logic gets a message from the input queue 135 (this starts a transaction). The Message Count is incremented by 1. A check is made to determine whether a Backout Count is greater than a Backout Threshold, and, if so, the message is put to the failure queue 145. If the Backout Count is not greater than a Backout Threshold, the database table 127 is updated and the message is put to the output queue 140.

A further check is made to determine whether the Message Count is greater than or equal to the Commit Count. If the Message Count is not greater than or equal to the Commit Count, processing logic gets another message from the input queue 135, and the above steps are repeated. If the Message Count is greater than or equal to the Commit Count, the transaction is committed for each message (a log write is forced for the transaction), and the Message Count is set to zero. There are a number of problems associated with this example.

First, although Commit Count, as implemented, speeds up the processing considerably, it has the drawback that if there is an error that causes the transaction to be backed out, the whole batch of messages is affected. For example, if Commit Count is set at "300" and the $200^{th}$ message causes an exception, all 200 messages in the current batch will be backed out, and later put in the failure queue. Second, database managers may resort, under heavy load, to "lock escalation," which can result in commits failing, even when there are no application errors. In particular, commits may fail when a large batch of messages is processed, even when smaller batches of messages that are processed having the same information will succeed.

A solution to the above problem is provided by a third example. In an implementation, there is provided a second, "cloned" message flow that runs with Commit Count=1. When the first message flow reads a message with Backout Count>Backout Threshold, instead of putting it to the failure queue, it puts it to the second, "cloned" message flow's input queue (the message is put to the input queue with Backout Count=0). When the second, "cloned" message flow reads a message with Backout Count=0, it processes it in the same way as the first message flow. When the second, "cloned" message flow reads a message with Backout Count>Backout Threshold, it puts the message to the failure queue. Referring back to the earlier example, if the $200^{th}$ message of a batch failed, the second, "cloned" message flow will successfully process messages 1 to 199, and the $200^{th}$ message will fail again and be put to the failure queue.

The third example introduces more problems. First, an extra administration overhead occurs in that there are two copies of the message flow to deploy and operate. Second, message sequence is lost, e.g., if a message fails in the middle of a large batch, each of the messages in the batch will be processed by the second (clone) flow in parallel with the first (original) flow. This may not be acceptable for applications that have to process messages in order.

SUMMARY

According to one embodiment of the present invention, an apparatus processes a batched unit of work associated with a plurality of messages, for use with a data store. A backout count, associated with a number of instances that work associated with the batched unit of work, is backed out. A backout threshold is associated with the backout count, and a commit count is associated with committing the batched unit of work in response to successful commits for a predefined number of the plurality of messages. The apparatus comprises a checker for checking whether the backout count is greater than zero and less than the backout threshold. An override component, responsive to the backout count being greater than zero and less than the backout threshold, overrides the commit count and commits the batched unit of work for a subset of the plurality of messages.

According to one embodiment of the present invention, a method processes a batched unit of work, associated with a plurality of messages, for use with a data store. A backout count, associated with a number of instances that work, is associated with the batched unit of work and is backed out. A backout threshold is associated with the backout count. A commit count is associated with committing the batched unit of work in response to successful commits for a predefined number of the plurality of messages. The backout count is checked to determine whether it is greater than zero and less than the backout threshold. In response to the backout count being greater than zero and less than the backout threshold, the commit count is overridden and the batched unit of work is committed for a subset of the plurality of messages.

According to one embodiment of the present invention, a computer program product processes a batched unit of work that is associated with a plurality of messages, for use with a data store. A backout count, associated with a number of instances that work with the batched unit of work, is backed out. A backout threshold is associated with the backout count. A commit count is associated with committing the batched unit of work in response to successful commits for a predefined number of the plurality of messages. The computer program product comprises a computer readable storage medium having computer readable program code embodied therewith. The computer readable program code comprises computer readable program code configured to check whether the backout count is greater than zero and less than the backout threshold. The computer readable program code is configured to override, responsive to the backout count being greater than zero and less than the backout threshold, the commit count and to commit the batched unit of work for a subset of the plurality of messages.

DETAILED DESCRIPTION

Figure 1:
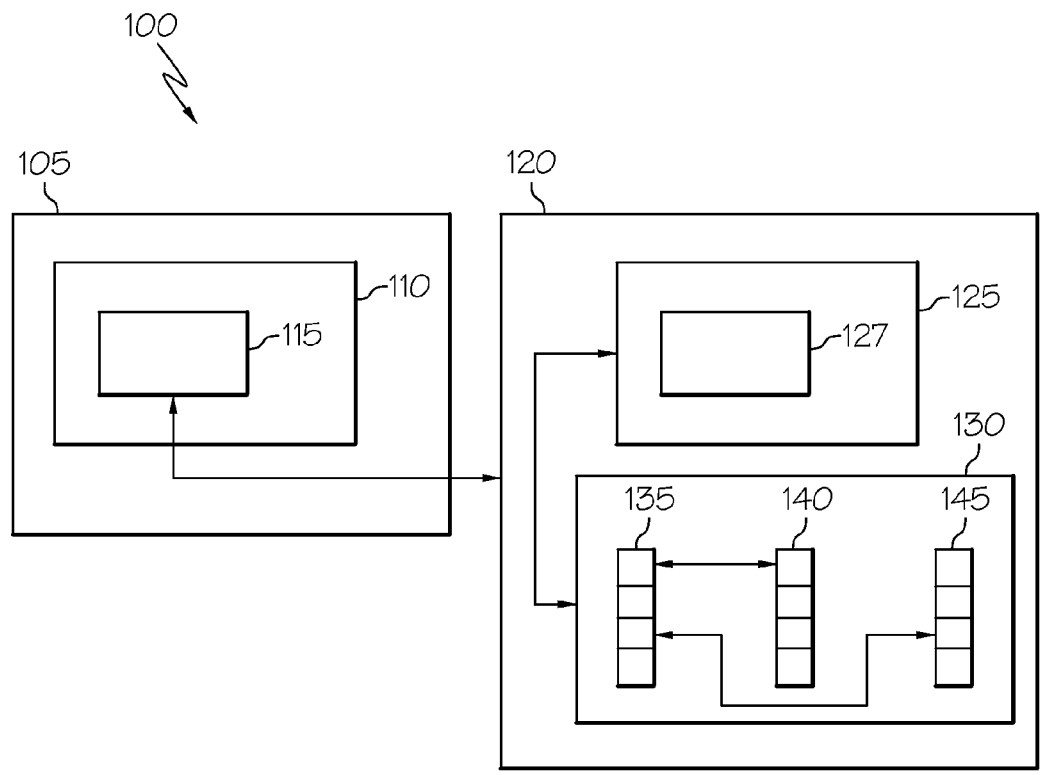
FIG. 1 is a block diagram of a system in which the preferred embodiment may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The ability to rapidly adopt, integrate and extend new and existing data processing technologies has become essential to the success of many businesses. Heterogeneity and change in data processing networks has become the norm, requiring communication solutions which achieve interoperability between the different systems. Application-to-application messaging via intelligent middleware products provides a solution to this problem. For example, IBM WebSphere MQ (IBM and WebSphere are registered trademarks of International Business Machines Corporation) messaging and queuing product family is known to support interoperation between application programs running on different systems in a distributed heterogeneous environment.

Some messaging products provide transactional messaging support, synchronizing messages within logical units of work in accordance with a messaging protocol which gives assured once and once-only message delivery even in the event of system or communications failures. Some products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept 'in doubt' and can be backed out atomically in the event of a failure.

The message queuing inter-program communication support provided by the WebSphere MQ products, for example, enables each application program to send messages to the input queue of any other target application program and each target application can asynchronously take these messages from its input queue for processing. This provides for assured delivery of messages between application programs which may be spread across a distributed heterogeneous computer network, without requiring a dedicated logical end-to-end connection between the application programs, but there can be great complexity in the map of possible interconnections between the application programs.

This complexity can be greatly simplified by including within the network architecture a communications hub to which other systems connect, instead of having direct connections between all systems. Message brokering capabilities can then be provided at the communications hub to provide intelligent message routing and integration of applications. Message brokering functions typically include the ability to route messages intelligently according to business rules and knowledge of different application programs' information requirements, using message 'topic' information contained in message headers, and the ability to transform message formats using knowledge of the message format requirements of target applications or systems to reconcile differences between systems and applications.

Some brokering capabilities (such as that provided, for example, by WebSphere Message Broker) provide intelligent routing and transformation services for messages which are exchanged between application programs using messaging products. Support for both management and development of message brokering applications can be implemented in a message broker architecture to provide functions including publish/subscribe message delivery, message transformation, database integration, message warehousing and message routing.

Figure 2:
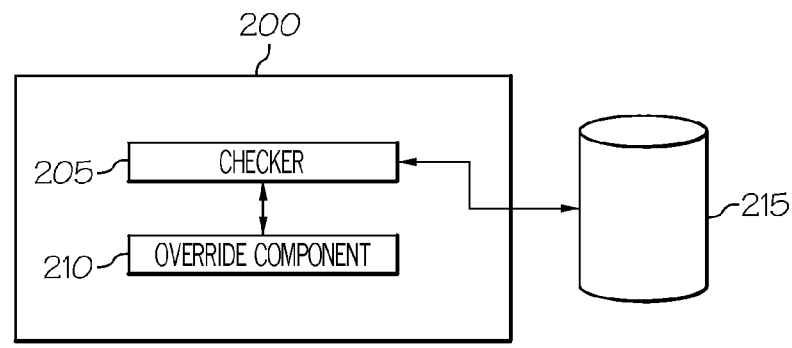
FIG. 2 is a block diagram of an apparatus of the preferred embodiment.

According to one embodiment, a controller 200 is depicted in FIG. 2. The controller 200 comprises a checker 205 and an override component 210. The checker 205 is operable to access a data store 215 which stores values of a Message Count, Commit Count, Backout Count, and a Backout Threshold. The controller 200 may be used with the system of FIG. 1.

The controller 200 is operable to use Commit Count conditionally, if the Backout Count is greater than zero (but below the Backout Threshold), the controller 200 ignores the Commit Count and commits the transaction for each message (as if Commit Count was 1).

Figure 3:
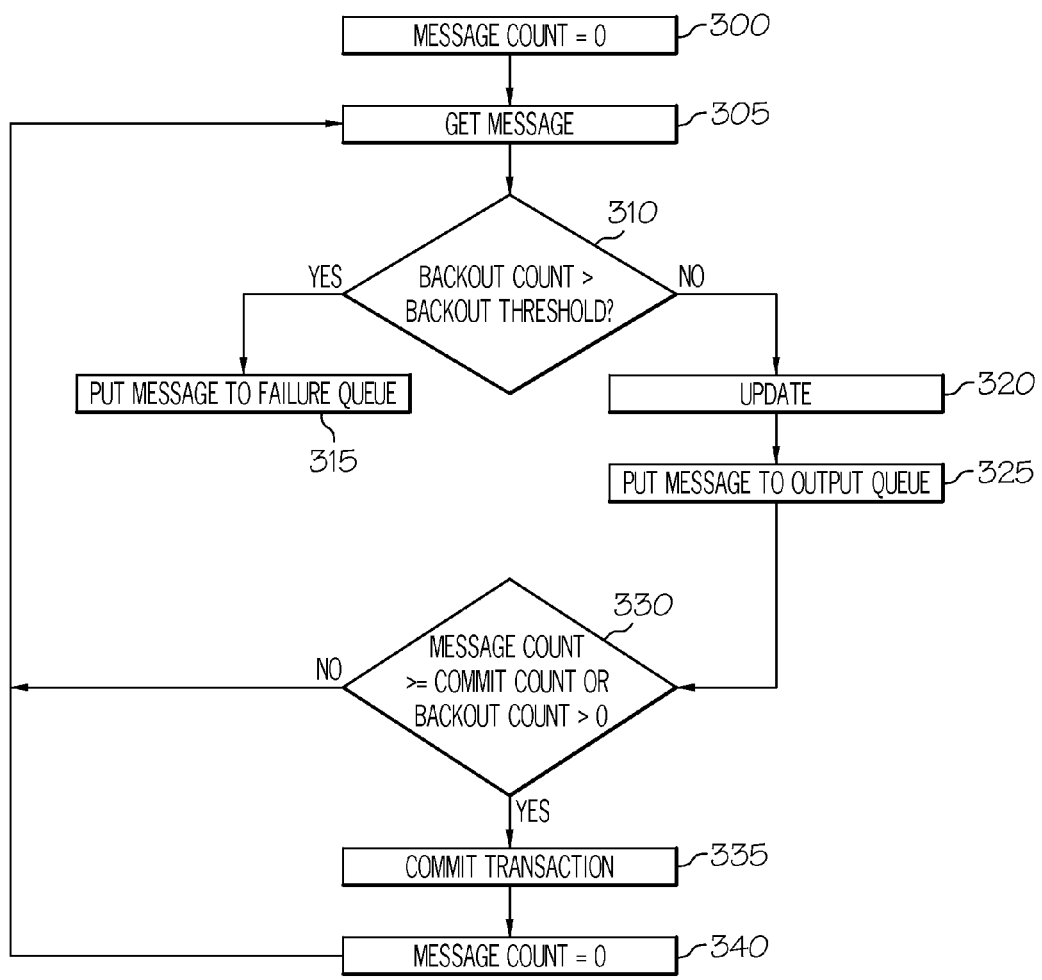
FIG. 3 is a flow chart showing the operational steps involved in a process according to the preferred embodiment.

A process in accordance with an embodiment of the present invention will be further described with reference to FIG. 3. At step 300, prior to processing, a Message Count is initially set at zero. At step 305, a message is 'got' from the input queue 135 as shown in FIG. 1 (this starts a transaction). The Message Count is incremented by 1. A check is made at step 310 by the checker 205 (FIG. 2), by accessing the data store 215, to determine whether a Backout Count is greater than a Backout Threshold, and, if so, the message is put to the failure queue 145 at step 315.

If the Backout Count is not greater than a Backout Threshold, the database table 127 is updated at step 320, and the message is put to the output queue 140 at step 325. A further check is made by the checker 205, by accessing the data store 215, to determine whether the Message Count is greater than or equal to the Commit Count or whether the Backout Count is greater than zero. If the Message Count is not greater than or equal to the Commit Count or the Backout Count is not greater than zero, another message is 'got' from the input queue 135. If the Message Count is greater than or equal to the Commit Count, the transaction is committed step 335 (a log write is forced) and the Message Count is set to zero at step 340.

If the Backout Count is greater than zero (but below the Backout Threshold), the override component 210 ignores the Commit Count and commits the transaction for each message (as if Commit Count was 1) at step 335. The Message Count is set to zero at step 340.

An example will now be described in which the Backout Threshold is "1" and the Commit Count is "5." At step 300, prior to processing, a Message Count is initially set at zero (note also that, for this example, the Backout Count is zero). At step 305, a message, M_1, is 'got' from the input queue 135 (this starts a transaction, e.g., T_1). The Message Count is incremented by 1 and stored in the data store 215.

A check is made at step 310 by the checker 205 to determine whether a Backout Count is greater than the Backout Threshold. If no failure occurs, the Backout Count stays at "0." As the Backout Count ("0") is not greater than the Backout Threshold ("1"), the database table 127 is updated at step 320 and the message, M_1, is put to the output queue 140 at step 325.

A further check is made by the checker 205 to determine whether the Message Count ("1") is greater than or equal to the Commit Count ("5") or whether the Backout Count ("0") is greater than zero. As neither of these conditions are true, in this example, another message is 'got' from the input queue (135).

At step 305, another message, M_2, is 'got' from the input queue 135 (note that the other message, M_2, is associated with the same transaction, T_1 that was started earlier). The Message Count is incremented by 1, resulting in a Message Count of "2" and stored in the data store (215).

A check is made by the checker 205 at step 310 to determine whether the Backout Count is greater than the Backout Threshold. At this point, in this example, a failure occurs (not shown in FIG. 3, for the sake of clarity), resulting in the work (the transaction T_1) being backed out and the two messages (M_1 and M_2) being "put back" on the input queue 135. Furthermore, the Backout Count is incremented by 1, resulting in a Backout Count of "1". The Message Count is set to "0" and stored in the data store 215.

The process passes back to step 305, where the first message, M_1, is got again from the input queue 135. This starts a new transaction, T_2. The Message Count is incremented by 1 resulting in a Message Count of "1."

A check is made at step 310 by the checker 205 to determine whether the Backout Count ("1") is greater than the Backout Threshold ("1"). If the checker 205 determines that the Backout Count ("1") is not greater than the Backout Threshold ("1"), the database table 127 is updated at step 320, and the first message, M_1, is put to the output queue 140 at step 325. A further check is made at step 330 by the checker 205 to determine whether the Message Count ("1") is greater than or equal to the Commit Count ("5"). In this example, this condition is not true.

The checker (205) also determines whether the Backout Count ("1") is greater than zero (but below the Backout Threshold of "1"). In this example, this condition is true. As a result, the override component 210 ignores the Commit Count of "5" (which typically means that the Message Count has to be greater than or equal to the Commit Count before the transaction is committed). Rather, the override component 210 causes the transaction (T_2) to be committed at step 335 (the result of this is as if Commit Count was "1"). The Message Count is set at step 340 to "0," and stored in the data store 215. The process passes back to step 305, where the second message, M_2, is 'got' again from the input queue 135. This starts a new transaction, T_3. The Message Count is incremented by 1 resulting in a Message Count of "1." A check is made at step 310 by the checker 205 to determine whether the Backout Count ("1") is greater than the Backout Threshold ("1"). In this example, the checker 205 determines that the Backout Count ("1") is not greater than the Backout Threshold ("1"). At this point, a failure occurs again (not shown in FIG. 3, for clarity), resulting in the work (the transaction T_3) being backed out and the second message, M_2, being "put back" on the input queue 135. Furthermore, the Backout Count is incremented by 1, resulting in a Backout Count of "2." The Message Count is set to "0" and stored in the data store (215).

The process passes back to step 305, where the second message, M_2, is 'got' again from the input queue 135. This starts a new transaction, T 4. The Message Count is incremented by 1 resulting in a Message Count of "1." A check is made at step 310 by the checker 205 to determine whether the Backout Count ("2") is greater than the Backout Threshold ("1"). In this example, the checker 205 determines that the Backout Count ("2") is greater than the Backout Threshold ("1"). At this point, the second message, M_2, is put to the failure queue 145 at step 315, and the transaction, T 4, is committed. The Message Count is set to zero at step 340. If more processing is to occur, the process passes to step 305, otherwise, the process ends.

Although it is possible to have a configuration attribute to enable or disable the behavior of an embodiment of the present invention, this is not strictly necessary. Preferably, an embodiment provides the default behavior whenever the input queue's Backout Threshold attribute is greater than 0.

Advantageously, by using Commit Count conditionally, the present invention ensures that only messages that result in errors are put on a failure queue 145. Messages that were backed out because they were in the same batch as a message in error are re-processed successfully, and their transaction committed, when they are 'got' again.

By using Commit Count conditionally, the present invention ensures that if a batch of messages fails, e.g., due to a transient problem in the database caused by use of a large batch (such as lock escalation, as described above), it will re-process the work automatically, and may succeed when committing one message per transaction (which is what the present invention executes when Backout Count is greater than zero). Further, by using Commit Count conditionally, the present invention ensures that if required, message sequence is preserved for all messages that are not in error.

It will be clear to one skilled in the art that many improvements and modifications can be made to the foregoing exemplary embodiment without departing from the scope of the present invention.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of processing a batched unit of work associated with a plurality of messages, for use with a data store, comprising:

recording a backout count, using a processor, associated with a number of instances that each message in the batched unit of work is backed out;

setting, using the processor, a backout count threshold associated with said backout count;

setting, using the processor, a commit count associated with committing the batched unit of work in response to successful commits for a predefined number of the plurality of messages;

checking, using the processor, whether the backout count for each said message is greater than the backout count threshold;

in response to the backout count corresponding to each message being greater than the backout count threshold, placing each said message on a failure queue, and getting, using the processor, another message;

in response to the backout count corresponding to each message being less than the backout count threshold, placing each said message on an output queue;

in response to placing each said message on an output queue, checking, using the processor, whether the backout count is greater than zero and less than the backout count threshold; and in response to the backout count being greater than zero and less than the backout count threshold for each said message, overriding the set commit count, using the processor, and committing each said message as a separate unit of work.

* * * * *